2,999,872
METAL SALT AMINOALCOHOL COMPLEXES
W E Craig, Philadelphia, and John O'N. Van Hook, Abington, Pa., assignors to Rohm & Haas Company, Philadelphia, Pa., a corporation of Delaware
No Drawing. Filed Mar. 6, 1958, Ser. No. 719,509
9 Claims. (Cl. 260—429)

The present invention relates to a novel series of metal salt-aminoalcohol complexes which exhibit outstanding fungicidal properties.

At least four factors are important in determining the suitability of a given compound as a fungicide, namely, high fungitoxicity against a broad spectrum of fungi, good tenacity, low phytotoxicity against the plant host, and good stability. The necessity for high fungitoxicity against a broad spectrum of fungi is obvious, but the three other factors are also of very real importance in determining the economic suitability of a given fungicide. Some compounds otherwise suitable as fungicides are deficient in tenacity, thus they are expensive to use because of their fugitive nature and the necessity for repeated applications. Other compounds, while exhibiting a high degree of fungitoxicity, cannot be used because they are also highly phytotoxic, causing serious damage to plants treated therewith. It has been found that some compounds exhibit suitable fungicidal activity when employed indoors under laboratory or greenhouse conditions, but exhibit appreciably less and economically unsatisfactory fungicidal activity when employed under field conditions. Further studies have revealed that this difference in indoor and outdoor activity is due to the destruction of the compounds under field conditions by ultraviolet light.

While the foregoing discussion pertains specifically to fungicides for use on plants, many of the criteria discussed above are also pertinent when assessing the value of compounds for broader use as general purpose fungicides. Thus for the protection of porous fibrous substrates, such as fabric, paper, belting, leather, etc., against fungal growth, chemical stability, and stability to ultraviolet light are also important properties. In many cases, water-insolubility is required in those applications in which permanence is important.

In accordance with the present invention, it has been surprisingly found that the ultraviolet stability of certain higher molecular weight aminoalcohols can be sharply increased by forming the complex of the aminoalcohol with certain metal salts. The metal salt aminoalcohol complexes of the present invention exhibit an excellent balance of the important properties necessary for a good fungicide, being highly fungitoxic, exhibiting good tenacity, showing low phytotoxicity, and being highly resistant to decomposition by the action of ultraviolet light. The water solubilities of these compounds are also of a low magnitude.

The compounds of the present invention are represented by the following structural formula:

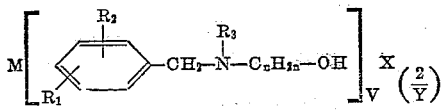

in which M is a divalent metallic ion selected from the group consisting of nickel, cobalt, cadmium, zinc, and copper, $R_1$ is alkyl containing from four to eighteen carbon atoms, $R_2$ is selected from the group consisting of hydrogen and lower alkyl, $R_3$ is selected from the group consisting of hydrogen and lower alkyl and -hydroxyethyl, X is an anion, $n$ is 2 to 3, Y is the valence of the anion X, and V is an integer of from 1 to 2, i.e., 1 or 2.

As is known in the art, the aminoalcohols employed as intermediates in the preparation of the higher molecular weight complexes of the present invention can be prepared by a variety of methods. For example, they can be derived advantageously from olefins by reactions such as:

(a) Reaction of the olefin with hypochlorous acid followed by reaction of the addition compound with an amine as shown in the following equations:

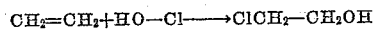

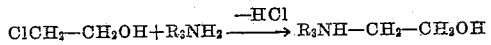

(b) Epoxidation of the olefin followed by reaction of the epoxide with an amine as shown in the following equations:

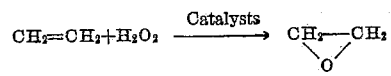

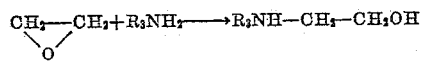

To prepare the di(hydroxyalkyl) derivatives (in which $R_3$ is $-CH_2CH_2OH$) it is necessary to react ammonia with two moles of chlorohydroxy alkane or with two moles of the epoxide.

These aminoalcohols can be further substituted by reaction with halides of the desired hydrocarbon substituents as shown in the following (X being a halide radical):

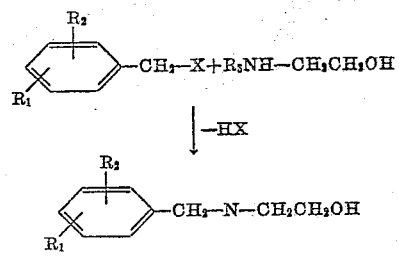

The benzyl halides ($R_1R_2C_6H_3CH_2X$) of this illustration are readily made by chloromethylation of the appropriate substituted benzenes.

The preparation of the metal salt complexes of these higher molecular weight aminoalcohols can be carried out using any one of several methods including the following methods:

(a) Adding a solution of the metal salts to a solution of the aminoalcohol in an inert organic solvent.

(b) Mixing the metal salt and the aminoalcohol without the use of solvent (when aminoalcohols are liquid).

The products obtained by method (a) vary in physical form depending on the particular amine and metallic salt employed. In some cases precipitates form on mixing the reactants. These can be removed by filtration and dried. In other cases the complexes are soluble in the solvent used and the solid complexes can be obtained by evaporation of the solvent. In those cases in which the solvent employed is non-phytotoxic, the solution as such can be employed as the essential ingredient of fungitoxic compositions.

Method (b) generally produces oils or mixtures of oils and crystals which can be dissolved in any suitable non-phytotoxic solvent, emulsified in water, or compounded into dusts for use as fungicidal compositions.

The preferred method of preparation of the above methods is method (a) in which the amine is dissolved in a lower alkanol, the metallic salt is dissolved in a lower alkanol, and the two alcoholic solutions are mixed. Preferred lower alkanols are methanol, ethanol and propanol. The order of addition is not critical, and although the complexes will form at room temperature, the reaction is favored with a moderate amount of heat. Relatively high temperatures are to be avoided, however, since there is an undesirable tendency toward breakdown of the complexes at elevated temperatures.

Although the molar ratios of the metallic salt to the aminoalcohols can be varied widely and still produce the products of the invention, the preferred ratio is one mole of metallic salt to one or more moles of the aminoalcohol, the latter being determined by the value of V.

Particularly effective metal salt-aminoalcohol complexes of the present invention include those in which the $R_1$ substituent of the benzene ring consists of a branched chain alkyl, the branched radicals being lower alkyls, i.e., alkyls containing one to four carbon atoms, particularly methyl or ethyl, and preferably methyl. Within this definition of $R_1$, a preferred class of alkyl substituents includes those in which the carbon atom linking the benzene ring bears two such lower alkyl substituents, preferably two methyl substituents. A particularly preferred class of such substituents is those in which $R_1$ contains eight to eighteen carbon atoms and the carbon atom attached to the benzene ring and each alternate carbon atom thereafter in the straight chain bear lower alkyl substituents, preferable methyl.

The following are cited as examples of substituents of the formula $R_1$:

1,1-dimethylpropyl
1,1,3-trimethylbutyl
n-Butyl
Sec-butyl
t-Butyl
1,1-dimethylbutyl
n-Pentyl
1,1,3,3-tetramethylbutyl
1,1-dimethylpentyl
1,1-diethylpentyl
1,1,3,3-tetramethylpentyl
n-Hexyl
1,1-dimethylhexyl
1,1-diethylhexyl
1,1,3,3-tetramethylhexyl
1,1,3,3,5,5-hexamethylhexyl
n-Heptyl
1-methylheptyl
1,1,3,3,5,5-hexamethylheptyl
n-Octyl
1,1,3,3-tetramethyloctyl
1,1,3,3,5,5,7,7-octamethyloctyl
n-Decyl
1,1,2,2-tetraethyldecyl
1,1,3,3,5,5,7,7-octamethyldecyl
n-Dodecyl
1,1,3,3-tetramethyldodecyl
1,1,3,3,5,5-hexamethyldodecyl
n-Octadecyl
2,2,4-trimethylpentyl
2,2,-dimethylhexyl Various anions are suitable as the anion portion of the divalent metallic salts of nickel, cobalt, cadmium, zinc, and copper used in the preparation of the new compounds of this invention. Anions such as chlorides, bromides, iodides, sulfates, nitrates, phosphates, selenates, citrates, formates, acetates, and propionates can be employed, since it appears that the anion portion of the complex does not measurably affect the fungicidal activity of the complex. The preferred anions are the chlorides, bromides, sufates, nitrates, and acetates, since such metallic salts exhibit good water and lower alkanol solubility. The chlorides, sulfates, and acetates of the desired metals are most commonly employed because of their high solubilities and ready commercial availability.

The compounds of the present invention exhibit pronounced fungicidal activity as shown by the control of a large number of fungi such as those responsible for late blight of tomatoes, apple scab, and bean rust. Furthermore, they exhibit high fungitoxicities against such typical fungi as *Stemphylium sarcinaeforme* and *Monilinia fructicola*.

The compounds of the present invention can be formulated into fungicidal preparations employing methods well known to those skilled in the art. In the preparation of sprays for agricultural or horticultural use, the compound may be dissolved in a petroleum solvent such as xylene or a mixture of solvents, together with an emulsifying agent which permits dispersion of the fungicidal preparation in water. Dusts may be prepared by taking up the compound, after dissolving in petroleum solvent, with a finely divided solid, such as magnesium carbonate, talc, prophyllite, clay, magnesim aluminum silicate or other acceptable carriers. Wetting agents, sticking agents or dispersing agents may be used in such sprays and/or dusts.

A typical composition suitable for use as an agricultural spray may be prepared by dissolving 25 parts of bis[N-(2-hydroxyethyl)-4-(1,1,3,3,5,5-hexamethylhexyl)benzylamine] nickel (II) chloride in 70 parts of an aromatic solvent such as xylene. This solution becomes self-emulsifying on the addition of 5 parts of Triton WR-1339 (as described in Example 1, U.S. Patent 2,454,541). Good fungicidal activity was demonstrated under field conditions when used at the rate of 2 pounds active ingredient per acre.

Dusts may contain about one to ten percent of one or more of the metal salt aminoalcohol complexes, above defined. A typical composition is as follows:

5 parts metal salt aminoalcohol complex
50 parts magnesium aluminum silicate (Diluex)
45 parts pyrophyllite Wettable powders are often times desired and may be formulated as follows:

25 parts metal salt-aminoalcohol complex
50 parts magnesium aluminum silicate (Diluex)
24 parts clay
1 part Tamol N (condensed sodium naphthalene sulfonate-formaldehyde)

Tests described hereinafter employed various compounds of the present invention for the purpose of illustrating fungitoxicity and the low level of phytotoxicity As a matter of convenience, the compounds tested are identified by number. The chemical identity of these numbered compounds, each being a mixture of isomers, is as follows:

| Compound No. | Name |
| --- | --- |
| (1) | Bis[N-(2-hydroxyethyl)dodecylmethylbenzylamine] nickel (II) chloride. |
| (2) | Bis[N-(2-hydroxyethyl)-(1-methylheptyl)benzylamine] nickel (II) chloride. |
| (3) | Bis[N-(2-hydroxyethyl)dodecylmethylbenzylamine] nickel (II) chloride. |
| (4) | Bis[N-(2-hydroxyethyl)dodecylmethylbenzylamine] cadmium (II) chloride. |
| (5) | [N-(2-Hydroxyethyl)dodecylmethylbenzylamine] copper (II) chloride. |
| (6) | Bis[N-(2-hydroxyethyl)dodecylmethylbenzylamine] zinc (II) chloride. |
| (7) | Bis[N,N-di(2-hydroxyethyl)dodecylmethylbenzylamine] nickel (II) chloride. |
| (8) | Bis[N-(2-hydroxyethyl)dodecylmethylbenzylamine] nickel (II) nitrate. |
| (9) | Bis[N-(2-hydroxyethyl)dodecylbenzylamine] copper (II) sulfate. |
| (10) | Bis[N-(2-hydroxyethyl)octadecylbenzylamine] nickel (II) chloride. |
| (11) | [N-(2-Hydroxyethyl)dodecylbenzylamine] copper (II) chloride. |

TEST 1

The spray formulations of this test were prepared, as were certain of those employed in Test 3 described hereinafter, from complex compounds produced in accordance with method (a) above, as 35% ethanol solutions. Specifically, 25 parts acetone was added to 0.86 part of each 35% ethanol solution and after mixing, 224 parts of water was added. Such formulations are cloudy dispersions and contain the equivalent of about 1 lb. of complex per 100 gals. of finished spray. The formulations containing 0.5 lb. per 100 gals. test spray may be prepared by dilution of the above-finished spray.

In this test, individually potted tomato plants 4 to 5 inches tall (4-leaf stage) were sprayed to the point of run-off with the test compound. After the plants had dried they were inoculated with a spore suspension of *Phytophthora infestans* containing 30,000 sporangia per ml. The plants were immediately placed in an incubation cabinet held at 10–12° C. and 100% relative humidity.

After incubation under these conditions for 24 hours the plants were placed on a bench in the greenhouse and held for seven days, at which time each plant was ranked for the percentage of leaf area infected.

Each treatment was replicated five times. The average rank reading was calculated according to the following system:

*Percent leaf area infected*

0=none
1=trace (one small lesion)
2=1–5% (few lesions)
3=6–17%
4=16–30%
5=>30%

A ranking below 2 is considered to be excellent. The results of this test were as follows:

| Compound No. | Ranking at— | | Injury at— | |
|---|---|---|---|---|
| | 1.0 lb. per 100 gal. | 0.5 lb. per 100 gal. | 1.0 lb. per 100 gal. | 0.5 lb. per 100 gal. |
| (1) | 0.8 | 0.8 | Slight | Slight |
| Untreated | 5.0 | 5.0 | None | None |

TEST 2

In the fungitoxicity portion of this test, the method utilized is one standardized by the American Phytopathological Society, Committee on Standardization of Fungicidal Tests. All details of this test are presented on pages 627–632, volume 33 of Phytopathology, July 1943.

The series of dilutions for this test were prepared by dissolving 1 gram of each of the compounds identified below in 20 cc. of solvent and then adding 79 cc. of water to make a 1% solution of the compound. This stock solution was then serially diluted with water to concentrations of 0.1%, 0.01%, 0.001%, and 0.0005%. The solvents used with each of the compounds listed are identified in the following table:

Compound No.:                                                Solvent
- (1) — Acetone
- (2) — Acetone
- (3) — Acetone
- (4) — Ethanol
- (5) — Acetone
- (6) — Ethanol
- (7) — Ethanol
- (8) — Acetone
- (9) — Acetone
- (10) — Acetone
- (11) — Acetone A spore suspension of *Monilinia fructicola* (M.f.) or *Stemphylium sarcianeforme* (S.s.) in an amount of 0.5 cc. was added to 2 cc. of each of the different serial dilutions and four drops of each of the resulting suspensions were pipetted onto individual cellulose nitrate coated glass slides. These slides were then placed in large Petri plates sealed with water and held at a constant temperature for a period of 16–24 hours, at which time the percentage of spores showing no germination was determined. This was done by counting 25 spores in the center of each of the four drops on each slide with the proper correction being made for non-viable spores as determined by the control (untreated) slides in each chamber. *Stemphylium sarcianeforme* spores were standardized to 5,000 and *Monilinia fructicola* to 10,000 per ml. in these tests. The data obtained were then plotted on logarithmic probability paper and straight line curves were drawn by inspection. The $LD_{50}$ values were determined by extrapolation. This value is the concentration at which 50% of the test spores would be prevented from germinating.

In the phytotoxicity portion of this test, individually potted tomato plants were sprayed to the point of run-off with the test compounds at concentrations of 1%, 0.1%, and 0.01% active ingredient. The plants were immediately placed on a bench in the greenhouse after treatment. Each treatment was replicated three times. At the end of seven days each plant was ranked according to the system presented below for injury.

*Injury rank on tomatoes*

0=none
1=slight
2=moderate
3=severe
4=dead

The results of these tests were as follows:

| Compound No. | Fungitoxicity | | Phytotoxicity v. Tomatoes at | | |
|---|---|---|---|---|---|
| | $LD_{50}$ S.s. p.p.m. | $LD_{50}$ M.f. p.p.m. | 1% | 0.1% | 0.01% |
| (1) | 5–10 | 5–10 | 0 | 0 | 0 |
| (2) | <1 | 10–50 | 3 | 0 | 0 |
| (3) | <5 | <1 | 4 | 0 | 0 |
| (4) | 5–10 | 5–10 | 2 | 0 | 0 |
| (5) | 5–10 | 10–50 | 1 | 0 | 0 |
| (6) | <5 | <5 | 4 | 2 | 0 |
| (7) | 10–50 | 10–50 | 2 | 0 | 0 |
| (8) | <1 | 1–5 | 4 | 1 | 0 |
| (9) | 5–10 | <5 | 3 | 0 | 0 |
| (10) | 10–50 | 10–50 | 3 | 0 | 0 |
| (11) | 5–10 | <5 | 0 | 0 | 0 |

TEST 3

An apple scab test was conducted as follows:

Individually potted apple whips (3 feet tall) were sprayed to the point of run-off with the treating agent (prepared as described in Test 1 above) and allowed to dry. They were then inoculated with an aqueous spore suspension (*Venturia inaequalis*) and immediately placed in an incubation cabinet (100% relative humidity and 75° F.) After two days incubation in this cabinet they were moved to a bench in the greenhouse and held there for three weeks. The percentage of leaf area showing infection was then estimated.

The results of this test were as follows:

| Compound No. | Concentration (lb./100 gal.) | Percent of Total Leaf Area Infected |
|---|---|---|
| (1) | 1.0 | 0.5 |
| | 0.5 | 5.0 |
| (7) | 1.0 | 5.0 |
| | 0.5 | 4.5 |
| Untreated | | 39.5 |

The examples appearing hereinafter are for the purpose of illustrating the preparation of various active complexes of the present invention. In these examples, the reactions are carried out at room temperature and the parts employed are parts by weight.

EXAMPLE I

*Bis[N(2-hydroxyethyl)-4-(1,1,3,3,5,5-hexamethylhexyl) benzylamine]nickel (II) chloride*

A solution of 51.1 parts (0.16 mole) of N(2-hydroxyethyl)-4-(1,1,3,3,5,5 - hexamethylhexyl)benzylamine in 33.2 parts of ethanol added to a solution of 10.0 parts (0.08 mole) of nickel chloride hexahydrate in 89.6 parts of ethanol yields the above compound in solution. The compound can be isolated from solution by distilling off the solvent.

Example II

*Bis[N(2-hydroxyethyl)-4-octadecylbenzylamine] (II) chloride*

A solution of 19.2 parts of N(2-hydroxyethyl)-4-octadecylbenzylamine in 190 parts of ethanol added to a solution of 5.9 parts of nickel chloride hexahydrate in 25 parts of ethanol obtains the above compound in solution.

Example III

*Bis[N(2-hydroxyethyl)-5-(1,1,3,3,5,5-hexamethylhexyl)-2-methylbenzylamine] nickel (II) chloride*

A solution of 33 parts of N(2-hydroxyethyl)-5-(1,1,3,3,5,5 - hexamethylhexyl) - 2 - methylbenzylamine in 50 parts of ethanol added to a solution of 11.8 parts of nickel chloride hexahydrate in 50 parts of ethanol yields solution of the above compound.

Example IV

*Bis[N,N-di(2-hydroxyethyl)-5-(1,1,3,3,5,5-hexamethylhexyl)-2-methylbenzylamine] nickel (II) chloride*

A solution of 75.4 parts of N,N-di(2-hydroxyethyl)-5-(1,1,3,3,5,5-hexamethylhexyl) - 2 - methylbenzylamine in 100 parts of ethanol added to a solution of 23.7 parts of nickel chloride hexahydrate in 100 parts of ethanol obtains the above compound as a precipitate on cooling.

Example V

*Bis[N(3-hydroxypropyl)-4-(1,1,3,3,5,5-hexamethylhexyl)benzylamine] nickel (II) chloride*

A solution of 33.5 parts of N(3-hydroxypropyl)-4-(1,1,3,3,5,5-hexamethylhexyl)benzylamine in 50 parts of ethanol added to a solution of 11.8 parts of nickel chloride hexahydrate in 50 parts of ethanol yields a solution of the above compound which, upon removal of the ethanol, is an amorphous material.

Example VI

*Bis[N(2-hydroxyethyl)-4-octadecylbenzylamine] zinc (II) nitrate*

A solution of 32.2 parts of N(2-hydroxyethyl)-4-octadecylbenzylamine in 100 parts of methanol added to a solution of 11.9 parts of zinc nitrate in 100 parts of methanol yields the above complex readily at room temperature.

Example VII

*Bis[N(2-hydroxyethyl)-4-(1-methylheptyl)benzylamine]cobalt (II) acetate*

A solution of 5.29 parts of N(2-hydroxyethyl)-4-(1-methylheptyl)benzylamine in 100 parts of propanol added to a solution of 2.49 parts of cobalt acetate in 200 parts of propanol yields the above complex immediately.

Example VIII

*Bis[N(2-hydroxyethyl)-4-(1,1,3,3,5,5-hexamethylhexyl)benzylamine] cadmium (II) bromide*

A solution of 25.5 parts of N(2-hydroethyl)-4-(1,1,3,3,5,5-hexamethylhexyl)benzylamine in 100 parts of ethanol added to a solution of 13.6 parts of cadmium bromide in 100 parts of ethanol forms the complex immediately.

Example IX

*Bis[N(2-hydroxyethyl)-5-octadecyl-2-methylbenzylamine] copper (II) sulfate*

A solution of 33.4 parts of N(2-hydroxyethyl)-5-octadecyl-2-methylbenzylamine in 100 parts of methanol added to a solution of 9.96 parts of copper sulfate in 100 parts of methanol yields the above complex immediately.

Example X

Repeating the process as set forth in Example I by substituting 0.08 mole of each of nickel bromide, nickel nitrate, nickel sulfate, nickel citrate and nickel acetate for the nickel chloride obtains complexes with the substituted salts which exhibit satisfactory fungicidal activity.

Example XI

*Bis[N-(2-hydroxyethyl)-2-butyl-5-octylbenzylamine]zinc (II) bromide*

A solution of 31.9 parts of N-(2-hydroxyethyl)-2-butyl-5-octylbenzylamine in 100 parts of ethanol added to a solution of 11.3 parts of zinc bromide in 100 parts of ethanol forms a soluble complex which may be isolated by evaporation of the solvent.

Example XII

*Bis[N-(2-hydroxyethyl)-N-methyl-4-butylbenzylamine] cadmium (II) nitrate*

A solution of 22.1 parts of N-(2-hydroxyethyl)-N-methyl-4-butylbenzylamine in 50 parts of methanol added to a solution of 15.4 parts of cadmium nitrate tetrahydrate in 100 parts of methanol obtains the above complex.

Example XIII

*[N(2-hydroxyethyl)-2,5-di-t-butylbenzylamine] copper (II) chloride*

N-(2-hydroxyethyl) - 2,5 - di-t-butylbenzylamine (26.3 parts) poured onto 13.5 parts of powdered copper chloride and stirred at 100° C. until the copper chloride dissolves yields the desired complex.

The foregoing description of the present invention, including the examples, is for the purpose of illustration and is not limiting to the scope of the invention.

We claim:

1. A compound of the formula

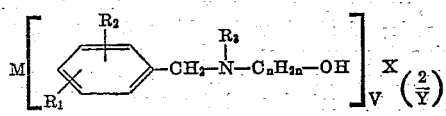

wherein M is a divalent metallic ion selected from the group consisting of nickel, cobalt, cadmium, zinc and copper, $R_1$ is alkyl containing from four to eighteen carbon atoms, $R_2$ is selected from the group consisting of hydrogen and lower alkyl, $R_3$ is selected from the group consisting of hydrogen, lower alkyl and 2-hydroxyethyl, X is an anion selected from the group consisting of halide, sulfate, nitrate, phosphate, selenate, citrate, and lower alkanoate, $n$ is an integer of from 2 to 3, Y is the valence of the anion X, and V is an integer of from 1 to 2.

2. A compound as set forth in claim 1 in which the benzene ring linking carbon atom of $R_1$ and each alternate carbon atom thereafter in the straight chain of $R_1$ are lower alkyl substituted.

3. A compound as set forth in claim 2 in which the lower alkyl substituents are methyl groups.

4. A compound as set forth in claim 1 in which the benzene ring linking carbon atom of $R_1$ has two methyl substitutents.

5. A compound as set forth in claim 1 in which the divalent metallic ion is copper.

6. A compound as set forth in claim 1 in which the divalent metallic ion is nickel.

7. A compound as set forth in claim 1 in which the divalent metallic ion is cobalt.

8. A compound as set forth in claim 1 in which the divalent metallic ion is zinc.

9. A compound as set forth in claim 1 in which the divalent metallic ion is cadmium.

References Cited in the file of this patent

UNITED STATES PATENTS

| | | |
|---|---|---|
| 2,686,798 | Gmitter | Aug. 17, 1954 |
| 2,798,102 | Schaeffer et al. | July 2, 1957 |
| 2,867,566 | Weinberg | Jan. 6, 1959 |